US011939010B2

(12) United States Patent
Pramod et al.

(10) Patent No.: US 11,939,010 B2
(45) Date of Patent: Mar. 26, 2024

(54) FAULT TOLERANT CONTROL OF REAR STEER VEHICLES

(71) Applicant: STEERING SOLUTIONS IP HOLDING CORPORATION, Saginaw, MI (US)

(72) Inventors: Prerit Pramod, Saginaw, MI (US); Michael A Eickholt, Chesaning, MI (US); David P. Holm, Brant, MI (US); Rakesh Mitra, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 402 days.

(21) Appl. No.: 16/709,162

(22) Filed: Dec. 10, 2019

(65) Prior Publication Data
US 2020/0353976 A1 Nov. 12, 2020

Related U.S. Application Data

(60) Provisional application No. 62/846,088, filed on May 10, 2019.

(51) Int. Cl.
*B62D 5/04* (2006.01)
*B62D 3/12* (2006.01)
(Continued)

(52) U.S. Cl.
CPC .......... *B62D 5/0487* (2013.01); *B62D 3/126* (2013.01); *B62D 6/002* (2013.01); *B62D 15/0225* (2013.01)

(58) Field of Classification Search
None
See application file for complete search history.

(56) References Cited

U.S. PATENT DOCUMENTS 6,701,237 B2  3/2004 Sebastian et al.
7,877,177 B2  1/2011 Kueperkoch et al.
(Continued)

FOREIGN PATENT DOCUMENTS

CN  101016025 A  8/2007
CN  104210542 A  12/2014
(Continued)

OTHER PUBLICATIONS

Chinese Office Action and Search report issued by the Chinese State Intellectual Property Office for related Chinese Application No. 202010392552.7 dated Mar. 22, 2022, 9 page(s).
(Continued)

*Primary Examiner* — Aniss Chad
*Assistant Examiner* — Mahmoud M Kazimi
(74) *Attorney, Agent, or Firm* — Dickinson Wright PLLC

(57) ABSTRACT

A method for vehicle stabilization includes, in response to a determination that a fault occurred in a rear steering mechanism, identifying a fault type associated with the fault. The method also includes determining whether a position of a rack of the rear steering mechanism is controllable based on the fault type. The method also includes, in response to a determination that the position of the rack is controllable, selectively positioning the rack to a center position and holding, using a motor control system of the rear steering mechanism, the rack in the center position. The method also includes, in response to a determination that the position of the rack is not controllable, holding, using the motor control system of the rear steering mechanism, the rack in a current position.

20 Claims, 6 Drawing Sheets

(51) Int. Cl.
    *B62D 6/00*     (2006.01)
    *B62D 7/14*     (2006.01)
    *B62D 7/15*     (2006.01)
    *B62D 15/02*     (2006.01)

(56) References Cited

U.S. PATENT DOCUMENTS

| | | | |
|---|---|---|---|
| 2003/0028304 A1* | 2/2003 | Klein | G05B 9/02 |
| | | | 180/443 |
| 2003/0028307 A1* | 2/2003 | Sebastian | G01B 21/26 |
| | | | 180/443 |
| 2004/0162650 A1 | 8/2004 | Kueperkoch et al. | |
| 2008/0059018 A1* | 3/2008 | Kueperkoch | B60G 17/0185 |
| | | | 701/30.3 |
| 2009/0292417 A1 | 12/2009 | Ishikawa | |
| 2016/0288827 A1 | 10/2016 | Bebernes et al. | |
| 2018/0334186 A1* | 11/2018 | Bebernes | A01B 69/007 |

FOREIGN PATENT DOCUMENTS

| | | |
|---|---|---|
| CN | 104875786 A | 9/2015 |
| CN | 105774902 A | 7/2016 |
| CN | 109070936 A | 12/2018 |
| CN | 109204442 A | 1/2019 |
| ES | 2698949 T3 | 2/2019 |
| KR | 20040081926 A | 9/2004 |

OTHER PUBLICATIONS

Second Office Action and Search Report issued by the Chinese State Intellectual Property Office for related Chinese Application No. 202010392552.7 dated Nov. 14, 2022, 11 pages.

* cited by examiner

FAULT TOLERANT CONTROL OF REAR STEER VEHICLES

CROSS-REFERENCES TO RELATED APPLICATIONS

This patent application claims priority to U.S. Provisional Patent Application Ser. No. 62/846,088, filed May 10, 2019 which is incorporated herein by reference in its entirety.

TECHNICAL FIELD

This disclosure relates to vehicle stabilization and in particular to systems and methods for fault tolerant control of vehicles having rear steering systems.

BACKGROUND OF THE INVENTION

Vehicles, such as cars, trucks, sport utility vehicles, crossovers, mini-vans, or other suitable vehicles, typically include a front steering system that controls steering of a set of front wheels and/or a front steering rack. In addition, some vehicles may include a rear steering system that controls steering of a set of rear wheels and/or a rear steering rack. Such a rear steering system may include an active rear steering system or a passive rear steering system. Typically, the rear steering system is configured to provide increased vehicle stability, particularly while the vehicle is cornering.

Typically, the rear steering system receives information from the front steering system indicating a position of the front wheels and/or a position of the front steering rack. The rear steering system may use various controllers and actuators (e.g., or other electrical, mechanical, and/or electromechanical devices) to selectively control positioning of the rear wheels and/or rear steering rack of the vehicle based on the position of the information from the front steering system. For example, the rear steering system may position the rear wheels and/or the rear steering rack based on the position of the front wheels or front steering rack as the vehicle traverses a curve, which may provide improved vehicle stability, among other benefits.

SUMMARY OF THE INVENTION

This disclosure relates generally to vehicle fault tolerant control.

An aspect of the disclosed embodiments includes a system for vehicle stabilization. The system includes a processor and a memory. The memory includes instructions that, when executed by the processor, cause the processor to: in response to a determination that a fault occurred in a rear steering mechanism, identify a fault type associated with the fault; determine whether a position of a rack of the rear steering mechanism is controllable based on the fault type; in response to a determination that the position of the rack is controllable: selectively position the rack to a center position; and hold, using a motor control system of the rear steering mechanism, the rack in the center position; and in response to a determination that the position of the rack is not controllable, hold, using the motor control system of the rear steering mechanism, the rack in a current position.

Another aspect of the disclosed embodiments includes a method for vehicle stabilization. The method includes, in response to a determination that a fault occurred in a rear steering mechanism, identifying a fault type associated with the fault. The method also includes determining whether a position of a rack of the rear steering mechanism is controllable based on the fault type. The method also includes, in response to a determination that the position of the rack is controllable, selectively positioning the rack to a center position and holding, using a motor control system of the rear steering mechanism, the rack in the center position. The method also includes, in response to a determination that the position of the rack is not controllable, holding, using the motor control system of the rear steering mechanism, the rack in a current position.

Another aspect of the disclosed embodiments includes a vehicle steering system. The system includes a first steering mechanism configured to control a position of a first steering rack. The system also includes a second steering mechanism configured to control a position of a second steering rack based on a current position of the first steering rack. The system also includes a processor and a memory. The memory includes instructions that, when executed by the processor, cause the processor to: in response to a determination that a fault occurred in the second steering mechanism, identify a fault type associated with the fault; determine whether a position of the second steering rack is controllable based on the fault type; in response to a determination that the position of the second steering rack is controllable: selectively position the second steering rack to a center position; and hold, using a motor control system of the second steering mechanism, the second steering rack in the center position; and in response to a determination that the position of the second steering rack is not controllable, hold, using the motor control system of the second steering mechanism, the second steering rack in a current position.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
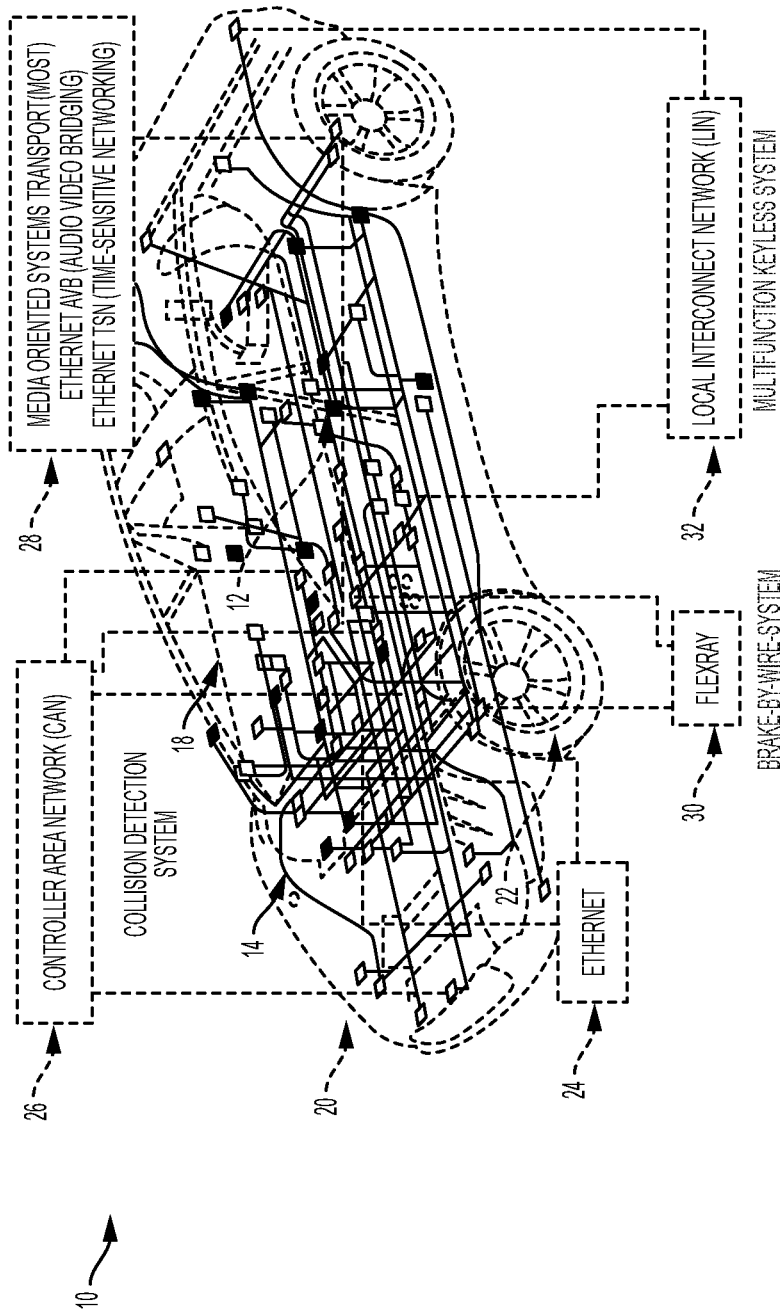
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, typically include a front steering system that controls steering of a set of front wheels and/or a front steering rack. In addition, some vehicles may include a rear steering system that controls steering of a set of rear wheels and/or a rear steering rack. Such a rear steering system may include an active rear steering system or a passive rear steering system. Typically, the rear steering system is configured to provide increased vehicle stability, particularly while the vehicle is cornering.

Typically, the rear steering system receives information from the front steering system indicating a position of the front wheels and/or a position of the front steering rack. The rear steering system may use various controllers and actuators (e.g., or other electrical, mechanical, and/or electromechanical devices) to selectively control positioning of the rear wheels of the rear steering rack of the vehicle based on the position of the front wheels and/or a position of the front steering rack. For example, the rear steering system may position the rear wheels and/or the rear steering rack relative to the front wheels and/or front steering rack as the vehicle traverses a curve, which may provide improved vehicle stability, among other benefits.

However, under various fault conditions (e.g., a rear steering actuator is inoperable), in such vehicles equipped with a rear steering system, if the rear wheels are left uncontrolled (e.g., allowed to move freely), the vehicle may exhibit instability, especially at high vehicle speeds.

Accordingly, systems and methods, such as those described herein, that are configured to provide enhanced or improved vehicle stability, thereby enhancing vehicle fault tolerance, may be desirable. In some embodiments, the systems and methods described herein may be configured to stabilize a vehicle having with a rear steering system under various fault conditions by selectively positioning the rear wheels and/or the rear steering rack to a center position. The systems and methods described herein may be configured to hold the rear wheels and/or the rear steering rack in the center position.

In some embodiments, the systems and methods described herein may be configured to, in response to determining that the rear wheels (e.g., or the rear steering rack) are incapable of being positioned in the center position, hold any fixed (e.g., current position) position. In some embodiments, the systems and methods described herein may hold the rear wheels and/or the rear steering rack in a position (e.g., the center position or other fixed position) based on a operability of actuators (e.g., in a motor control system) of the rear steering system to control the rear wheels in both a steady state and a dynamic state.

The steady state may refer to a maximum torque-speed that rear steering system is operable to generate during the fault. For example, if one inverter fails in a dual inverter/motor system, the capability is reduced by half. The dynamic state may refer to a bandwidth of a motor control system of the rear steering system, which may be degraded in response to, for example, a current measurement fault.

In some embodiments, the systems and methods described herein may hold the rear wheels and/or the rear steering rack in a position (e.g., the center position or other fixed position) based on a tuning of a position controller of the rear steering system. For example, under various fault conditions, the actuators of the rear steering system may have full, reduced or no operability, due to the nature of the fault.

In some embodiments, the systems and methods described herein may be configured to set a position command of rack position tracking controller to zero in order to control positioning of the rear wheels to the center position. In some embodiments, the systems and methods described herein may be configured to selectively position the rear wheels to the target position relatively quickly and without undesirable overshoot (e.g. the rack positioning tracking controller gains in fault conditions may be set differently, and may be further variable based on operability during the fault). In some embodiments, the systems and methods described herein may be configured to provide a desired overall steering dynamic performance at a desired and expected operating point (e.g., approximately the zero position).

In some embodiments, the systems and methods described herein may be configured to hold the position of the rear wheels in a relatively stiff and robust manner (e.g., by rejecting external disturbances, such as road forces). In some embodiments, the systems and methods described herein may be configured to hold the position of the rear wheels using the position controller with a zero command.

In some embodiments, the systems and methods described herein may be configured to hold the position of the rear wheels by disabling the position controller and making an actuator behave like a brake. In some embodiments, the systems and methods described herein may be configured to short the motor of the rear steering system to ground via an inverter.

In some embodiments, the systems and methods described herein may be configured to, in response to a determination that a fault occurred in a rear steering mechanism, identify a fault type associated with the fault. The systems and methods described herein may be configured to determine whether a position of a rack of the rear steering mechanism is controllable based on the fault type. The systems and methods described herein may be configured to, in response to a determination that the position of the rack is controllable, selectively position the rack to a center position and holding, using a motor control system of the rear steering mechanism, the rack in the center position. The systems and methods described herein may be configured to, in response to a determination that the position of the rack is not controllable, hold, using the motor control system of the rear steering mechanism, the rack in a current position.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
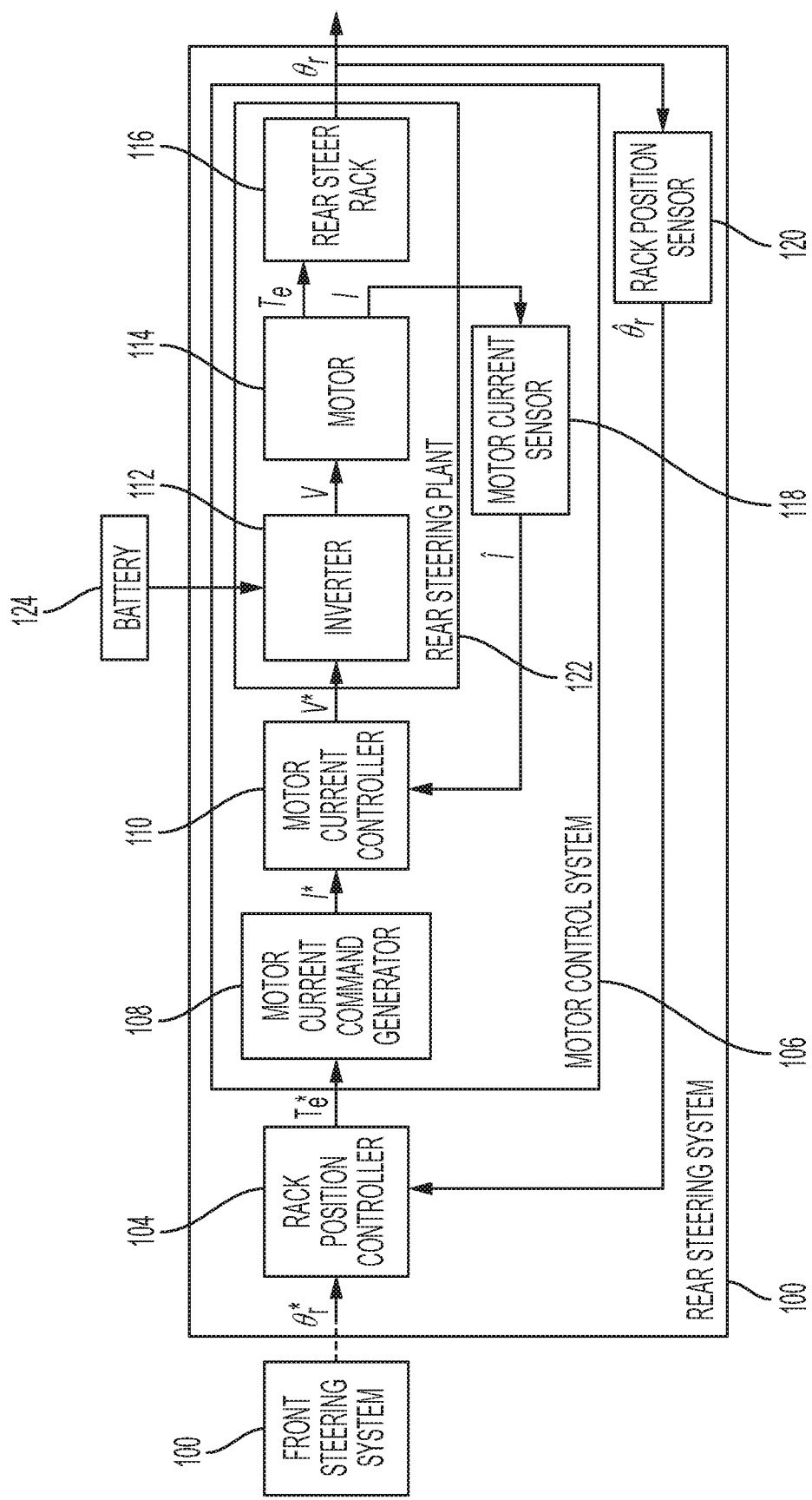
FIG. 2 generally illustrates a steering control system according to the principles of the present disclosure.
Figure 5:
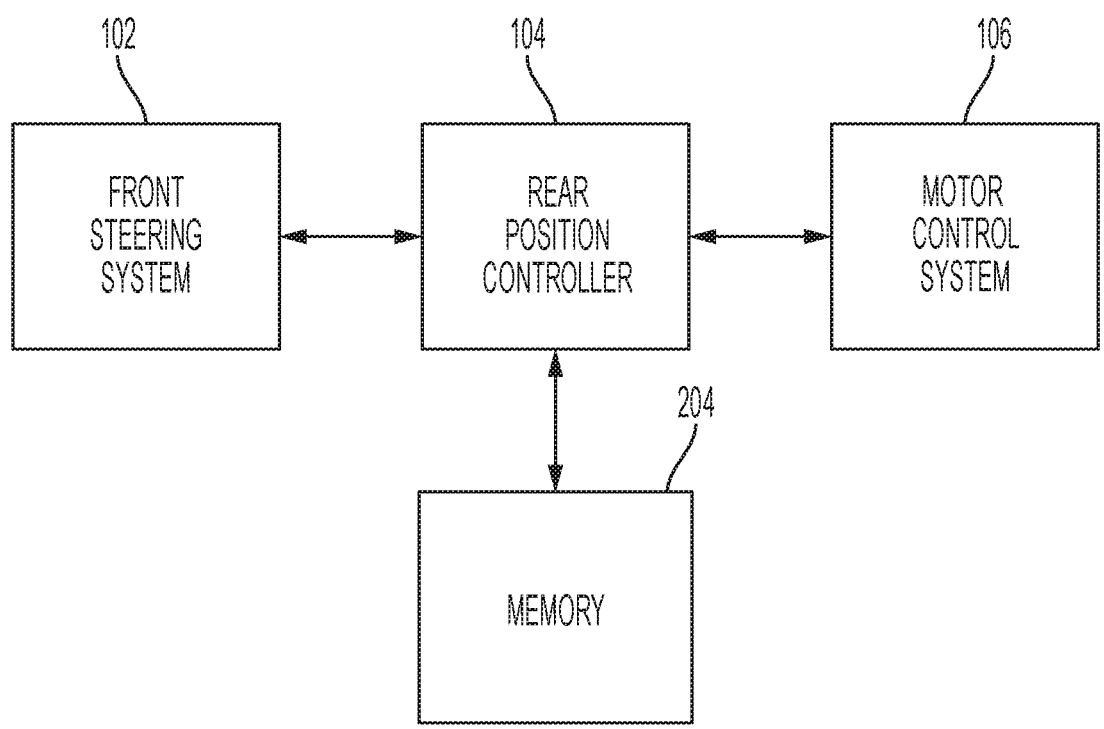
FIG. 5 generally illustrates a vehicle stabilization system according to the principles of the present disclosure.

The vehicle 10 may include a rear steering system 100, as is generally illustrated in FIG. 2. The system 100 may include, or be in communication with, a front steering system 102. The front steering system 102 may include any suitable steering system and may be configured to selectively control positioning and/or steering of the front wheels 22 and/or a front steering rack of the vehicle 10. The system 100 includes a rack position controller 104. The rack position controller 104 may include any suitable controller or processor. For example, the rack position controller 104 may include a processor and be in communication with a memory 204, as is generally illustrated in FIG. 5.

The processor may include any suitable processor, such as those described herein. The memory 204 may include instructions that, when executed by the processor, cause the processor to, at least, control positioning of the rear wheels 22 of the vehicle 10. The memory 204 may comprise a single disk or a plurality of disks (e.g., hard drives), and includes a storage management module that manages one or more partitions within the memory 204. In some embodiments, memory 204 may include flash memory, semiconductor (solid state) memory or the like. The memory 204 may include Random Access Memory (RAM), a Read-Only Memory (ROM), or a combination thereof.

The rack position controller 104 may be in communication with the front steering system 102. For example, the rack position controller 104 may be in direct communication with the front steering system 102 or may be in indirect communication with the front steering system 102 (e.g., the rack position controller 104 and the front steering system 102 may communicate via a network or other controller). The rack position controller 104 may receive one or more front steering position signals from the front steering system 102. The front steering position signals may indicate a current position of the front wheels 22 and/or a current position of the front steering rack of the vehicle 10 and/or a future position of the front wheels 22 and/or a future position of the front steering rack of the vehicle 10. For example, the front steering system 102 may receive measurements from a position sensor configured to measure a position of the front wheels 22 and/or a position of a steering rack associated with the front wheels 22. The position measurement may include a position of the front wheels 22 and/or the front steering rack relative to a reference position (e.g., distance from a center position) and/or may include an angle of rotation of the front wheels 22 relative to the reference position. The front steering system 102 may generate a front steering position signal indicating the measured position of the front wheels 22 (e.g., including the angle of rotation) and/or the front steering rack.

Additionally, or alternatively, the front steering system 102 may determine a target position of the front wheels 22 and/or the front steering rack based on input received from a steering mechanism of the vehicle 10. The steering mechanism may include a steering or hand wheel controlled by the operator of the vehicle 10. The front steering system 102 may determine a target position of the front wheels 22 and/or the front steering rack based on an angle of rotation of the steering mechanism.

In some embodiments, the vehicle 10 may operator autonomously or semi-autonomously. For example, the operator of the vehicle 10 may not engage the steering mechanism (e.g., in the case where the vehicle 10 is an autonomous vehicle, the vehicle 10 may not include a steering mechanism) while the vehicle 10 is in operation. The front steering system 102 may receive a signal from one or more autonomous or semi-autonomous systems within the vehicle 10 indicating a target position of the front wheels 22 and/or the front steering rack. The front steering system 102 may be configured to position the front wheels 22 and/or the steering rack associated according to the target position.

The front steering system 102 may generate the front steering position signal based on the target position. The front steering system 102 may communicate one or more front steering position signals to the rack position controller 104 indicating a measured position of the front wheels 22, a measured position of the front steering rack, a target position of the front wheels 22, a target position of the front steering rack, or a combination thereof.

In some embodiments, the rack position controller 104 may be configured to determine a position of the front steering rack and/or a position of the front wheels 22. For example, the rack position controller 104 may be in communication with the position sensor configured to measure the position of the front steering rack and/or the position of the front wheels 22.

The rack position controller 104 is configured to selectively control a position of a rear steering rack 116 associated with the rear wheels 22 and/or the position of the rear wheels 22. For example, the system 100 may include a motor control system 106. The motor control system 106 includes a motor current command generator 108, a motor current controller 110, an inverter 112, and a motor 114. The rack position controller 104 may determine a target position of the rear wheels 22 and/or the rack 116 based on the front steering position signals. For example, the rack position controller 104 may calculate a target position for the rear wheels 22 and/or the rack 116 that, in combination with the position of the front wheels 22 and/or the front steering rack, provides stability to the vehicle 10 during operation of the vehicle 10. The rack position controller 104 may determine the position of the rear wheels 22 and/or the rack 116 using any suitable technique. The target position of the rear wheels 22 and/or the rack 116 may indicate an angle of rotation and/or a position relative to a reference position and/or reference angle.

The rack position controller 104 generates one or more rear steering motor torque command signals that may cause the rear wheels 22 and/or the rack 116 to reach the target positon (e.g., with respect to the reference position and/or the reference angle). The rack position controller 104 communicates the one or more rear steering motor torque command signals to the motor current command generator 108. The motor current command generator 108 may be configured to generate a current command corresponding to a rear steering motor torque command signal. The current command may correspond to an amount of current or torque that, when provided to the motor 114, cause the rack 116 to move to the target position. The motor current command generator 108 communicates the current command to the motor current controller 110.

The motor current controller 110 generates a voltage command based on the current command. The motor current controller 110 may be in communication with the inverter 112. The inverter 112 may be configured to convert alternating current power provided by a battery of the vehicle 10 to direct current power. The motor current controller 110 selectively controls output of the inverter 112 based on the voltage command. The inverter 112, in response to control by the motor current controller 110, outputs a corresponding voltage to the motor 114. The motor 114 generates current in response to the voltage input. The current generates torque which causes the motor 114 to move at a velocity corresponding to the generated torque. The motor 114 is in communication with the rack 116. As the motor 114 moves, the rack 116 moves (e.g., into the target position) responsive to the movement of the motor 114. As the rack 116 moves, the rear wheels 22 move (e.g., into the target position) responsive to the movement of the rack 116.

In some embodiments, the motor control system 106 includes a closed-loop control system. For example, the motor control system 106 may include a motor current sensor 118 configured to measure of the current flowing through the windings of the motor 114. The motor current sensor 118 generates a measured or estimated current. In some embodiments, a motor position sensor, such as an encoder or a magnetic sensor, may be employed to sense a position of the motor 114. For example, the motor current estimate may be determined based on the measured current and/or the motor position signals.

The motor sensor communicates the motor current signal to the motor current controller 110. The motor current controller 110 may compare the current generated by the motor 114 to the commanded current to generate a voltage command. The motor current controller 110 may selectively adjust the voltage command based on the comparison. For example, the motor current controller 110 may selectively increase or decrease the voltage associated with the voltage command corresponding to the motor current generated by the motor 114 being above or below the target motor current generated by the motor 114.

In some embodiments, the rack position controller 104 may receive a rack position measurement from a rack positon sensor 120. For example, the rack position sensor 120 may be configured to measure a position of the rear wheels 22 and/or a position of the rack 116. The rack position sensor 120 generates a signal indicative of the position of the rack 116 and communicates the signal to the rack position controller 104. The rack position controller 104 may selectively adjust the motor torque command to control the position of the rear wheels 22 to reach to the target position based on the measured rack position. For example, the rack position controller 104 may determine whether the rack position measured by the rack position sensor 120 indicates that the position of the rear wheels 22 and/or the rack 116 is greater than or less than the target position.

The rack position controller 104 may increase or decrease the angle of rotation or the position relative to the reference position of the rear wheels 22 and/or the rack 116 target position based on a determination that the position of the rear wheels 22 and/or the rack 116 is greater than or less than the target position, respectively. The rack position controller 104 may continuously monitor the rack position using the rack position sensor 120 and/or the front steering position signals and may continuously control the position of the rear wheels 22 and/or the rack 116 based on the rack position measured by the rack position sensor 120 and/or the front steering position signals.

In some embodiments, the rack position controller 104 is configured to selectively control the position of the rear wheels 22 and/or the rack 116 based on a determination that a fault occurred in the rear steering system 100. For example, the rack position controller 104 may determine that a fault occurred (e.g., loss of communication) between the front steering system 102 and the rack position controller 104. This may be referred to as a front steering fault. The rack position controller 104 may determine after a predetermined period that the communication between the front steering system 102 and the rack position controller 104 has failed in response to, after the predetermine period, not receiving the front steering position signal or other suitable communication from the front steering system 102. When the rack position controller 104 determines that a front steering fault has occurred, the rack position controller 104 may be unable to determine a position of the front wheels 22 and/or the steering rack associated with the front wheels 22. The rack position controller 104 may be unable to determine a target position for the rear wheels 22 and/or the rack 116 in response to a determination that the front steering fault occurred.

The rack position controller 104 may determine that a fault occurred in the position of the rear wheels 22 and/or the rack 116 (e.g., the rack position controller 104 is unable to control position of the rear wheels 22 and/or the rack 116). This may be referred to as a position control fault. The rack position controller 104 may determine a fault has occurred in the position of the rear wheels 22 and/or the rack 116 based on a determination that the rack position controller 104 is unable to determine a position of the rear wheels 22 and/or the rack 116. For example, the rack position controller 104 may not receive the rack position measurement 120 after a predetermined period, the rack position controller 104 may receive erroneous or inaccurate information from the rack position sensor 120, the rack position controller 104 may be unable to determine a rack position measurement, and/or other suitable indicators that the a fault has occurred in the position of the rear wheels 22 and/or the rack 116.

The rack position controller 104 may determine that a fault occurred in the motor control system 106. This may be referred to as a motor control fault. For example, the rack position controller 104 may determine that the measured rack position from the rack position sensor 120 is different from the target position. The rack position controller 104 may determine that a fault occurred in the motor control system 106 based on a determination that the difference is greater than a threshold. Additionally, or alternatively, the rack position controller 104 may determine that a software and/or hardware fault has occurred in the motor control system 106 based on a determination that the motor control system 106 is unable to regulator torque or current control of the motor 114. It should be understood that the rack position controller 104 may be configured to detect any suitable fault other than those described herein.

In some embodiments, the rack position controller 104 determines a fault type corresponding to the fault. The fault type may include a front steering fault type, a position control fault type, a motor control fault type, and/or other suitable fault type. The rack position controller 104 may selectively control the position of the rear wheels 22 and/or the rack 116 based on the fault type. For example, if the rack position controller 104 determines that a front steering fault and/or a position control fault has occurred (e.g., a fault having a front steering fault type or a fault having a position control fault type), the rack position controller 104 determines whether the rear wheels 22 and/or the rack 116 are capable of being positioned (e.g., that the motor control system 106 is operable to control the position of the rear wheels 22 and/or the rack 116).

If the rack position controller 104 determines that the rear wheels 22 and/or the rack 116 are capable of being positioned, the rack position controller 104 determines to position the rear wheels 22 and/or the rack 116 to the center position. The rack position controller 104 generates a rear steering motor torque command signal indicating the center position and communicates the rear steering motor torque command signal to the motor control system 106. The motor control system 106 selectively positions the rear wheels 22 and/or the rack 116 to the center position, as described.

Figure 3:
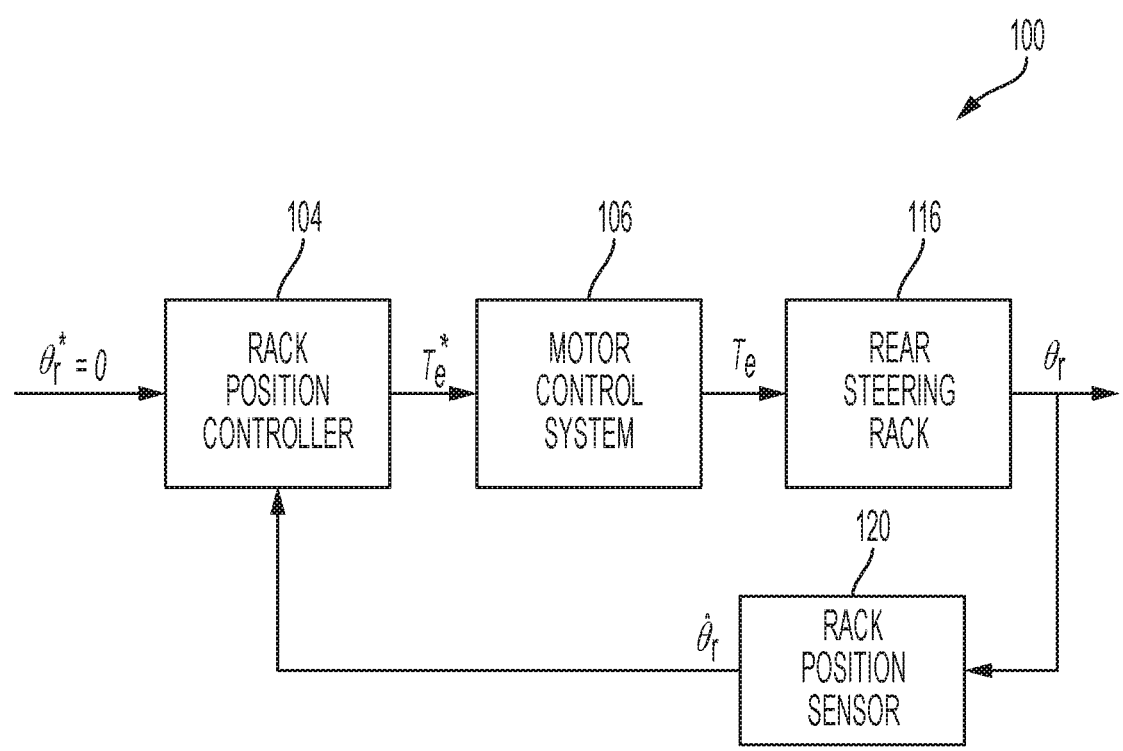
FIG. 3 generally illustrates a vehicle stabilization system according to the principles of the present disclosure.
Figure 4:
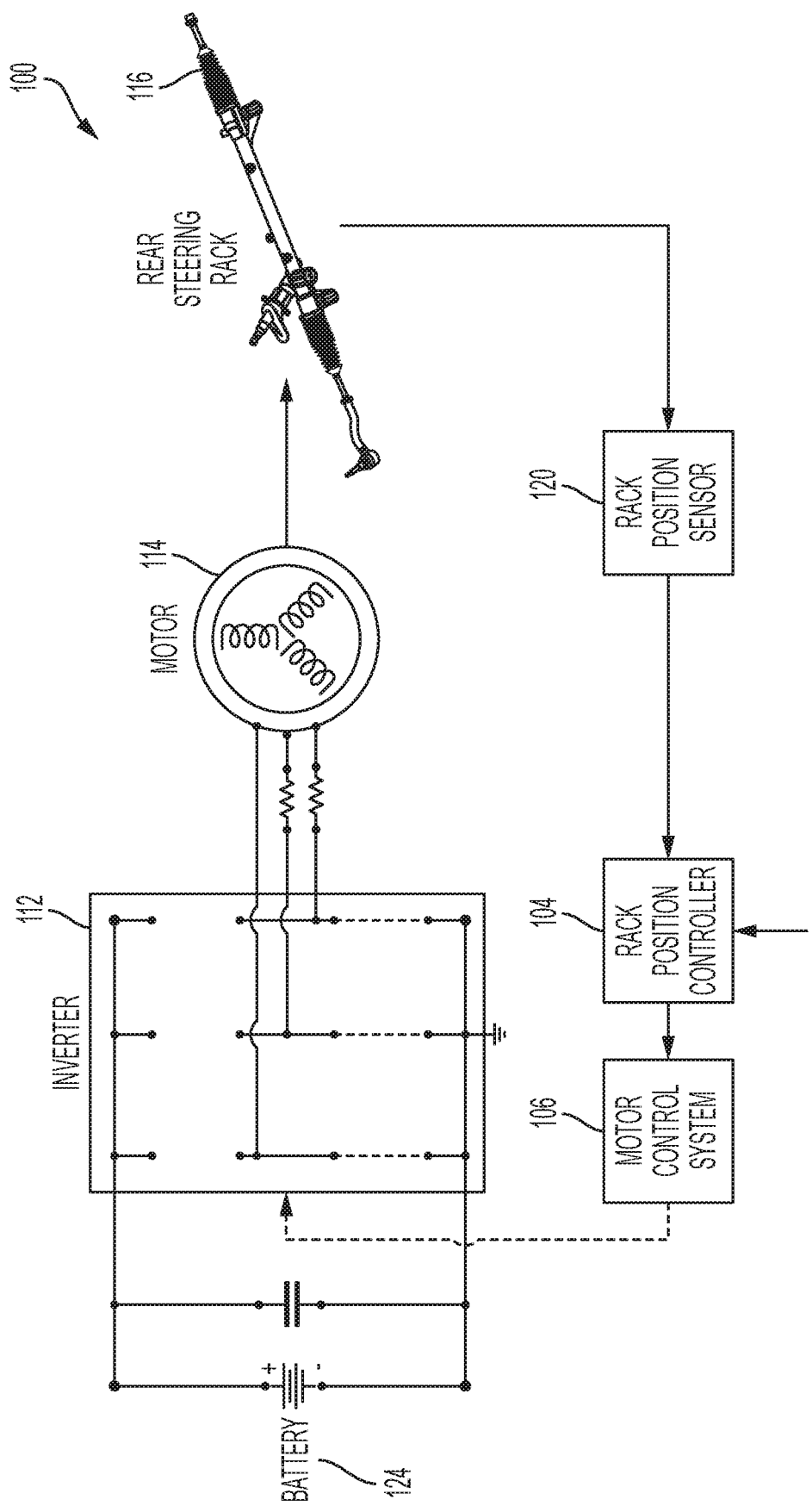
FIG. 4 generally illustrates a vehicle stabilization system according to the principles of the present disclosure.

The rack position controller 104 may be configured to hold the rear wheels 22 and/or the rack 116 in the center position. For example, the rack position controller 104 may hold the rear wheels 22 and/or the rack 116 in the center position by using a zero target position command, as is generally illustrated in FIG. 3. Additionally, or alternatively, rack position controller 104 may be configured to hold the center position of the rear wheels 22 and/or the rack 116 controlling the position to reach zero and subsequently instructing the motor control system 106 to control an actuator of the motor control system 106 to behave like a brake (e.g., the rack position controller 104 may instruct the motor control system 106 to short the motor 114 to ground via an inverter 112, as is generally illustrated in FIG. 4). Additionally, or alternatively, the rack position controller 104 may hold the center position of the rear wheels 22 and/or the rack 116 using any of the techniques described herein, any other suitable technique, or a combination thereof.

If the rack position controller 104 determines that the rear wheels 22 and/or the rack 116 are not capable of being positioned, the rack position controller 104 determines to hold a current position of the rear wheels 22 and/or the rack 116. The rack position controller 104 may hold the rear wheels 22 and/or the rack 116 in the current position by instructing the motor current controller 110 to directly cause the motor control system 106 to behave as a brake (e.g. by shorting the phases of the motor via the inverter lower switches) as is generally illustrated in FIG. 4, or by any other suitable technique.

In some embodiments, the rack position controller 104 may generate a fault signal indicating that a fault in the rear steering system 100 has occurred. The rack position controller 104 may communicate the fault signal to a display of the vehicle 10.

If the rack position controller 104 determines that a motor control fault has occurred (e.g., a fault having motor control fault type), the rack position controller 104 may disengage and/or discontinue position control of the rear wheels 22 and/or the rack 116. The rack position controller 104 may generate the fault signal indicating that a fault in the rear steering system 100 has occurred. The fault signal may also indicate that continued operation of the vehicle 10 may be unsafe. The rack position controller 104 may communicate the fault signal to the display in the vehicle 10. The operator of the vehicle 10 may discontinue operation of the vehicle 10 in response to the fault signal. It should be understood that the rack position controller 104 may determine and/or detect one or more faults in the rear steering system 100 and may determine and/or detect faults other than those described herein.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 6:
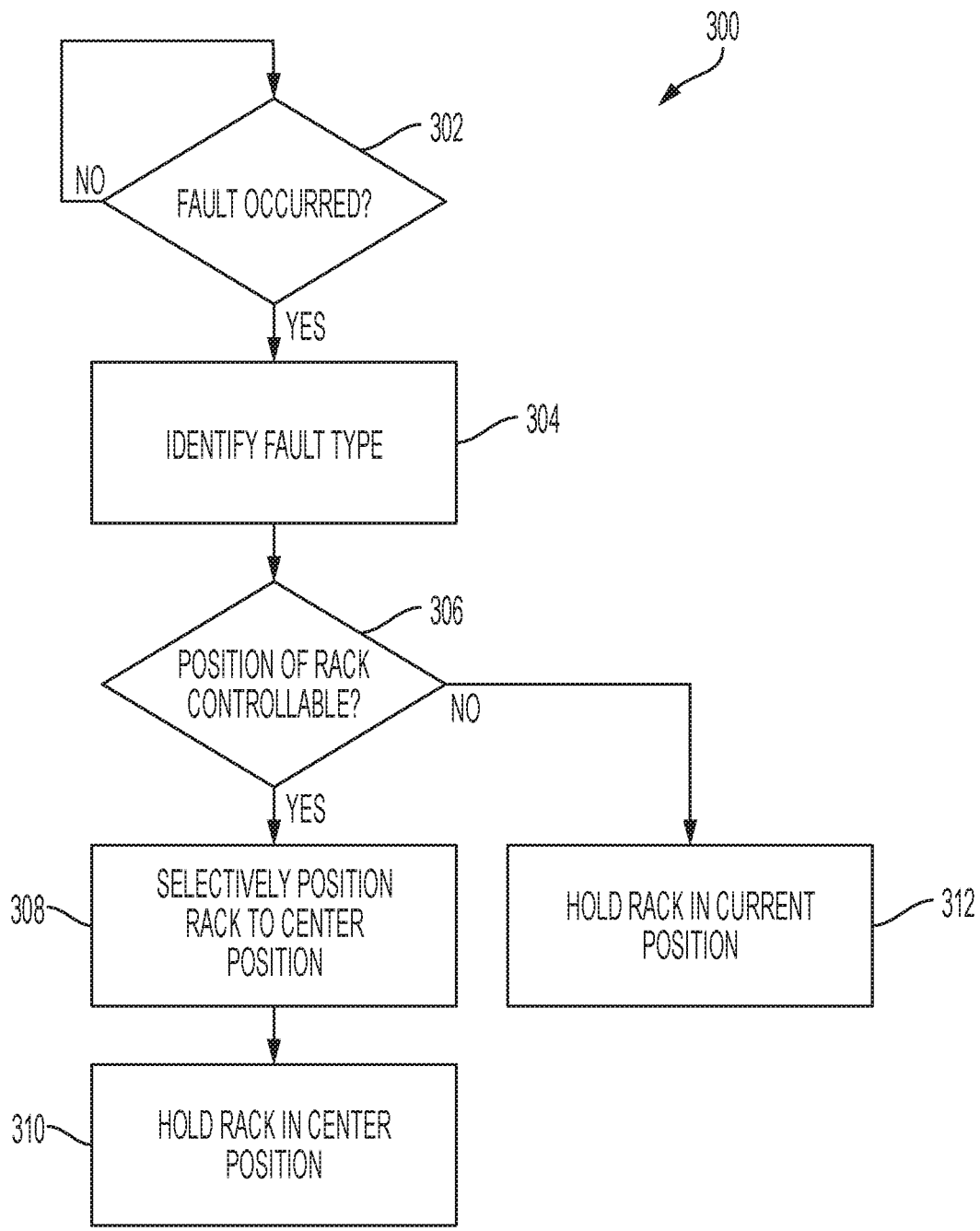
FIG. 6 is a flow diagram generally illustrating a vehicle stabilization method according to the principles of the present disclosure.

FIG. 6 is a flow diagram generally illustrating a vehicle stabilization method 300 according to the principles of the present disclosure. At 302, the method 300 determines whether a fault occurred. For example, the rack position controller 104 determines whether a fault occurred in the rear steering system 100. If the rack position controller 104 determines a fault has not occurred, the method 300 continues at 302. If the rack position controller 104 determines that a fault has occurred, the method 300 continues at 304.

At 304, the method 300 identifies a fault type. For example, the rack position controller 104 determines a fault type associated with the detected fault. At 306, the method 300 determines whether a position of a rack is controllable. For example, the rack position controller 104 determines, based on the fault type, whether the rack 116 (e.g., or the rear wheels 22) is capable of being positioned. If the rack position controller 104 determines that the rack 116 is not capable of being positioned, the method 300 continues at 312. If the rack position controller 104 determines that the rack 116 is capable of being positioned, the method 300 continues at 308.

At 308, the method 300 selectively positions the rack to a center position. For example, the rack position controller 104 selectively positions the rack 116 to the center position, as described. At 310, the method 300 holds the rack in the center position. For example, the rack position controller 104 holds the rack 116 in the center position, as described. At 312, the method 300 holds the rack in a current position. For example, the rack position controller 104 holds the rack 116 in the current position, as described.

In some embodiments, a system for vehicle stabilization includes a processor and a memory. The memory includes instructions that, when executed by the processor, cause the processor to: in response to a determination that a fault occurred in a rear steering mechanism, identify a fault type associated with the fault; determine whether a position of a rack of the rear steering mechanism is controllable based on the fault type; in response to a determination that the position of the rack is controllable: selectively position the rack to a center position; and hold, using a motor control system of the rear steering mechanism, the rack in the center position; and in response to a determination that the position of the rack is not controllable, hold, using the motor control system of the rear steering mechanism, the rack in a current position.

In some embodiments, the fault type indicates a fault between a front steering mechanism and the rear steering mechanism. In some embodiments, the fault type indicates a fault in a rack position controller of the rear steering mechanism. In some embodiments, the fault type indicates a fault in the motor control system of the rear steering mechanism. In some embodiments, the motor control system of the rear steering mechanism is configured to actively hold the rack in the center position. In some embodiments, the motor control system of the rear steering mechanism is configured to passively hold the rack in the center position. In some embodiments, the motor control system of the rear steering mechanism is configured to actively hold the rack in the current position. In some embodiments, the motor control system of the rear steering mechanism is configured to passively hold the rack in the current position.

In some embodiments, a method for vehicle stabilization includes, in response to a determination that a fault occurred in a rear steering mechanism, identifying a fault type associated with the fault. The method also includes determining whether a position of a rack of the rear steering mechanism is controllable based on the fault type. The method also includes, in response to a determination that the position of the rack is controllable, selectively positioning the rack to a center position and holding, using a motor control system of the rear steering mechanism, the rack in the center position. The method also includes, in response to a determination that the position of the rack is not controllable, holding, using the motor control system of the rear steering mechanism, the rack in a current position.

In some embodiments, the fault type indicates a fault between a front steering mechanism and the rear steering mechanism. In some embodiments, the fault type indicates a fault in a rack position controller of the rear steering mechanism. In some embodiments, the fault type indicates a fault in the motor control system of the rear steering mechanism. In some embodiments, the motor control system of the rear steering mechanism is configured to actively hold the rack in the center position. In some embodiments, the motor control system of the rear steering mechanism is configured to passively hold the rack in the center position. In some embodiments, the motor control system of the rear steering mechanism is configured to actively hold the rack in the current position. In some embodiments, the motor control system of the rear steering mechanism is configured to passively hold the rack in the current position.

In some embodiments, a vehicle steering system includes a first steering mechanism configured to control a position of a first steering rack. The system also includes a second steering mechanism configured to control a position of a second steering rack based on a current position of the first steering rack. The system also includes a processor and a memory. The memory includes instructions that, when executed by the processor, cause the processor to: in response to a determination that a fault occurred in the second steering mechanism, identify a fault type associated with the fault; determine whether a position of the second steering rack is controllable based on the fault type; in response to a determination that the position of the second steering rack is controllable: selectively position the second steering rack to a center position; and hold, using a motor control system of the second steering mechanism, the second steering rack in the center position; and in response to a determination that the position of the second steering rack is not controllable, hold, using the motor control system of the second steering mechanism, the second steering rack in a current position.

In some embodiments, the fault type indicates a communication fault between the first steering mechanism and the second steering mechanism. In some embodiments, the fault type indicates a fault in position control of the second steering rack. In some embodiments, the fault type indicates a fault in the motor control system of the second steering mechanism.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for vehicle stabilization, the system comprising:
   a processor; and
   a memory that includes instructions that, when executed by the processor, cause the processor to:
   in response to a determination that a fault occurred in a rear steering mechanism, identify a fault type associated with the fault;
   determine whether a position of a rack of the rear steering mechanism is controllable based on the fault type;
   in response to a determination that the position of the rack is controllable:
   selectively position the rack to a center position; and
   hold, using a motor control system of the rear steering mechanism, the rack in the center position using a rack position controller and a zero target position command; and
   in response to a determination that the position of the rack is not controllable, disable the rack position controller by shorting, via an inverter, one or more phases of a motor associated with the rear steering mechanism to ground to hold, using the motor control system of the rear steering mechanism, the rack in a current position, wherein the current position includes a position of the rack associated with the fault and wherein holding the rack in the current position incudes not moving the rack out of the current position.

2. The system of claim 1, wherein the fault type indicates a fault between a front steering mechanism and the rear steering mechanism.

3. The system of claim 1, wherein the fault type indicates a fault in the rack position controller of the rear steering mechanism.

4. The system of claim 1, wherein the fault type indicates a fault in the motor control system of the rear steering mechanism.

5. The system of claim 1, wherein the motor control system of the rear steering mechanism is configured to actively hold the rack in the center position.

6. The system of claim 1, wherein the motor control system of the rear steering mechanism is configured to passively hold the rack in the center position.

7. The system of claim 1, wherein the motor control system of the rear steering mechanism is configured to actively hold the rack in the current position.

8. The system of claim 1, wherein the motor control system of the rear steering mechanism is configured to passively hold the rack in the current position.

9. The system of claim 1, wherein shorting, in response to the determination that the position of the rack is not controllable, the one or more phases of a motor associated with the rear steering mechanism to hold, using the motor control system of the rear steering mechanism, the rack in a current position includes shorting all phases of the motor associated with the rear steering mechanism.

10. A method for vehicle stabilization, the method comprising:
    in response to a determination that a fault occurred in a rear steering mechanism, identifying a fault type associated with the fault;
    determining whether a position of a rack of the rear steering mechanism is controllable based on the fault type;

in response to a determination that the position of the rack is controllable:
  selectively positioning the rack to a center position; and
  holding, using a motor control system of the rear steering mechanism, the rack in the center position using a rack position controller and a zero target position command; and
in response to a determination that the position of the rack is not controllable, disabling the rack positon controller by shorting, via an inverter, one or more phases of a motor associated with the rear steering mechanism to ground to hold, using the motor control system of the rear steering mechanism, the rack in a current position, wherein the current position includes a position of the rack associated with the fault and wherein holding the rack in the current position incudes not moving the rack out of the current position.

11. The method of claim 10, wherein the fault type indicates a fault between a front steering mechanism and the rear steering mechanism.

12. The method of claim 10, wherein the fault type indicates a fault in the rack position controller of the rear steering mechanism.

13. The method of claim 10, wherein the fault type indicates a fault in the motor control system of the rear steering mechanism.

14. The method of claim 10, wherein the motor control system of the rear steering mechanism is configured to actively hold the rack in the center position.

15. The method of claim 10, wherein the motor control system of the rear steering mechanism is configured to passively hold the rack in the center position.

16. The method of claim 10, wherein the motor control system of the rear steering mechanism is configured to actively hold the rack in the current position.

17. A vehicle steering system, comprising:
  a first steering mechanism configured to control a position of a first steering rack;
  a second steering mechanism configured to control a position of a second steering rack based on a current position of the first steering rack;
  a processor; and
  a memory including instructions that, when executed by the processor, cause the processor to:
    in response to a determination that a fault occurred in the second steering mechanism, identify a fault type associated with the fault;
    determine whether a position of the second steering rack is controllable based on the fault type;
    in response to a determination that the position of the second steering rack is controllable:
      selectively position the second steering rack to a center position using a rack position controller and a zero target position command; and
      hold, using a motor control system of the second steering mechanism, the second steering rack in the center position; and
    in response to a determination that the position of the second steering rack is not controllable, disable the rack position controller by shorting, via an inverter, one or more phases of a motor associated with the rear steering mechanism to ground to hold, using the motor control system of the second steering mechanism, the second steering rack in a current position, wherein the current position includes a position of the second steering rack associated with the fault and wherein holding the second steering rack in the current position incudes not moving the second steering rack out of the current position.

18. The vehicle steering system of claim 17, wherein the fault type indicates a communication fault between the first steering mechanism and the second steering mechanism.

19. The vehicle steering system of claim 17, wherein the fault type indicates a fault in position control of the second steering rack.

20. The vehicle steering system of claim 17, wherein the fault type indicates a fault in the motor control system of the second steering mechanism.

* * * * *